United States Patent
Koshida et al.

(10) Patent No.: US 7,268,175 B2
(45) Date of Patent: Sep. 11, 2007

(54) THERMOPLASTIC RESIN COMPOSITIONS FOR LASER WELDING AND ARTICLES FORMED THEREFROM

(75) Inventors: Reiko Koshida, Tochigi (JP); Yoshiteru Hatase, Nara (JP)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/243,617

(22) Filed: Oct. 4, 2005

(65) Prior Publication Data

US 2006/0030650 A1   Feb. 9, 2006

Related U.S. Application Data

(63) Continuation of application No. 10/686,800, filed on Oct. 16, 2003, now abandoned, and a continuation of application No. 09/780,729, filed on Feb. 9, 2001, now abandoned.

(60) Provisional application No. 60/181,759, filed on Feb. 11, 2000.

(51) Int. Cl.
   *C08K 5/23*   (2006.01)
(52) U.S. Cl. ............. 524/190; 219/121.63; 219/121.64
(58) Field of Classification Search ................ 524/190; 219/121.63, 121.64
   See application file for complete search history.

(56) References Cited

U.S. PATENT DOCUMENTS

| | | |
|---|---|---|
| 4,093,584 A | 6/1978 | Zwahlen et al. |
| 4,094,839 A | 6/1978 | Riegler et al. |
| 4,263,197 A | 4/1981 | Lienhard et al. |
| 4,527,994 A | 7/1985 | Lienhard |
| 4,853,272 A | 8/1989 | Yeh et al. |
| 5,075,195 A | 12/1991 | Babler et al. |
| 5,489,639 A | 2/1996 | Faber |
| 2002/0056707 A1* | 5/2002 | Pinho et al. ........... 219/121.64 |
| 2003/0125429 A1* | 7/2003 | Joachimi et al. ............ 524/105 |
| 2004/0242757 A1* | 12/2004 | Ulrich et al. ................ 524/514 |

FOREIGN PATENT DOCUMENTS

| | | |
|---|---|---|
| EP | 1 029 650 | 2/2000 |
| JP | 2-305832 | 12/1990 |
| JP | 2841077 | 10/1998 |
| WO | WO 95/26869 | 10/1995 |
| WO | WO 00/20157 | 4/2000 |

OTHER PUBLICATIONS

Patent Abstracts of Japan, vol. 015, No. 092, JP 02 305832, Published Dec. 19, 1990, A Orient Chem., Ind., Ltd. "Coloratin of Thermoplastic Resin".

* cited by examiner

*Primary Examiner*—Peter Szekely

(57) ABSTRACT

Thermoplastic resin compositions are disclosed that incorporate 1:2 metallic azo complex dyes and are particularly suitable for laser welding. These compositions include a variety of thermoplastic resins such as polyamides and copolymers and blends thereof. The compositions offer superior welding properties and provide for the welding of articles identically colored with these dyes.

13 Claims, 1 Drawing Sheet

THERMOPLASTIC RESIN COMPOSITIONS FOR LASER WELDING AND ARTICLES FORMED THEREFROM

This application is a continuation of application Ser. No. 10/686,800, filed Oct. 16, 2003, now abandoned which is a continuation of application Ser. No. 09/780,729, filed Feb. 9, 2001, now abandoned which claims the benefit of provisional application No. 60/181,759, filed Feb. 11, 2000.

FIELD OF THE INVENTION

The instant invention relates to thermoplastic resin compositions incorporating organic dyes. More particularly, the instant invention relates to such compositions used in the laser welding of articles and wherein the dye is a metallic azo complex dye.

BACKGROUND OF THE INVENTION

It is known in the art to join together articles of two resins (one colored and opaque and the other colored and transparent) by applying energy with laser beams. This is accomplished by positioning the articles in contact with each other, and transmitting a predetermined amount of laser beam energy focused on the area of contact, thereby causing the junction portion to be melted and joined together (known generally as "laser welding"). Several advantages flow from laser welding. For example, laser welding is widely perceived as a simple, labor saving operation, with attendant improvements in productivity and reductions in production cost. This technique is useful in various applications including the preparation of molded articles suitable for automotive applications.

Recent attention has been directed to laser welding using blends of thermoplastic resins and colorants. The colorants typically contain an organic dye or pigment to control the conversion of laser energy to heat. In a conventional arrangement, the laser beam penetrates through a transparent colored article, positioned closest to laser beam source, and is then largely absorbed in the opaque colored article. The latter article has a relatively higher absorption coefficient in comparison with the transparent article, and this is attributed to the use of an appropriate amount of colorants. The net effect is that the area of contact of the transparent and opaque articles is melted and the surfaces are thereby joined together. See for example Japanese Published (Koukoku) Patent No. 62-49850, Japanese Published (Koukoku) Patent No. 5 (93)-42336.

Other resin composition associated with laser welding are described in U.S. Pat. No. 5,893,959, which discloses transparent and opaque workpiece parts welded together by a laser beam along a joining zone. Both parts contain black dye pigments such as carbon black to cause them to offer a substantially homogenous visual impression even after welding.

However, a difficulty associated with conventional compositions used in laser welding is that when a laser beam is transmitted through a first article (having laser beam transmitting colorants) to a second article (containing laser beam absorbing colorants), the two articles must have different transmission and absorption coefficients. This unfortunately makes it difficult to weld together articles having the same color. Moreover, thermoplastic components may be blackened by the addition of carbon black or nigrosine, as is commonly done in for example automotive applications. However, carbon black and nigrosine cannot transmit a laser beam with a main wavelength (1200 nm to 800 nm), such as Nd:YAG laser and a diode laser.

Surprisingly, it has now been found that including a specific weight percentage of 1:2 type metallic azo complex dye in thermoplastic resin compositions such as polyamide resin compositions used for laser-weldable molded articles results into both the transparent and opaque articles for the laser beam having the same color of black. This allows for a significantly improved transmission coefficient for the near-infrared spectrum of the laser beam, with excellent and balanced heat-resistance and mechanical properties required in automobile application.

SUMMARY OF THE INVENTION

Improved compositions suitable for laser welding are disclosed herein, comprising a thermoplastic resin and a 1:2 type metallic azo complex dye.

Moreover, there are disclosed and claimed herein themoplastic resin compositions for laser welding comprising:
1) at least one thermoplastic resin; and,
2) a black colorant having at least one of the metal azo complex dyes of the following formulas:

The Formula [I]

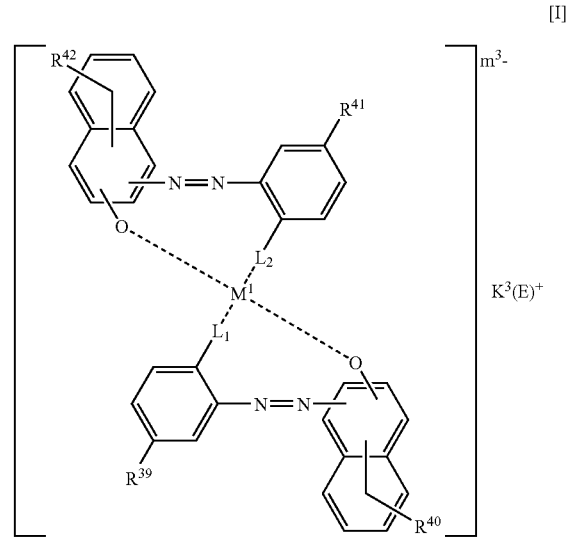

Wherein $R^{39}$, $R^{41}$, which may be the same or different, are Cl,

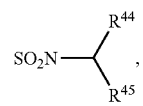

or $SO_2R^{43}$, $R^{44}$, $R^{45}$, which may be the same or different, are independently hydrogen atom, linear or branched C1-C4alkyl, $R^{43}$ is linear or branched C1-C4alkyl, $R^{40}$, $R^{42}$, which may be the same or different, are hydrogen, linear or branched C1-C18 alkyl group, linear or branched C2-C18 alkenyl group, sulfonamide group, carboxyl group, mesyl group, hydroxyl group, C1-C18 alkoxy group, acethylamino group, benzoylamino group, a halogen atom or —CONH—

$R^{46}$, $R^{46}$ is functional group selected from unsubstituted or substituted linear or branched C1-C18 alkyl or unsubstituted substituted C6-C18 aryl group, $L_1$ and $L_2$ are independently O or COO, $(E)^+$ are $H^+$; cation of alkali metal, ammonium ion, cations of organic amine including aliphatic primary, secondary and ternary amines, quaternary ammonium ion. , $K^3$ is an integer, $m^3$ is 0,1 or 2, $M^1$ is a kind of metals, preferably metals having coordination numbers of from 2 to 4, more preferably trivalent metal such as Cr, Fe, Cu;

The Formula [II]

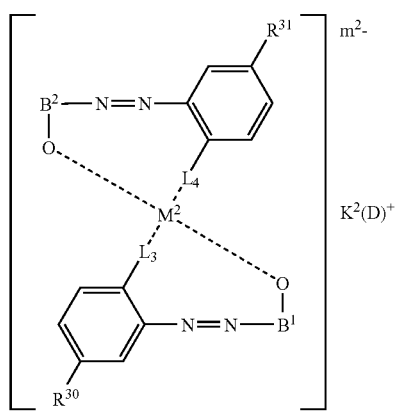

wherein $R^{30}$ and $R^{31}$, which may be the same of different, are Cl,

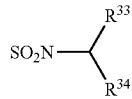

$SO_2R^{32}$, or H, $R^{33}$ and $R^{34}$, which may be the same or different, are independently hydrogen atom, linear or branched C1-C4 alkyl, $R^{32}$ is linear or branched C1-C4 alkyl, $L_3$ and $L_4$ are independently O or COO, $(D)^+$ is hydrogen ion, cation of alkali metals, ammonium ion, cations of organic amine including aliphatic primary, secondary and ternary amines, quaternary ammonium ion, $K^2$ is an integer, $m^2$ is 0,1 or 2, $M^2$ is metals of atomic numbers of from 2 to 4 such as Zn, Sr, Cr, Al, Ti, Fe, Zr, Ni, Co, Mn, B, Si and Sn, preferably metal of atomic numbers of 3 such as Cr, Co, Cu, Ni, Al.

B is represented by formula

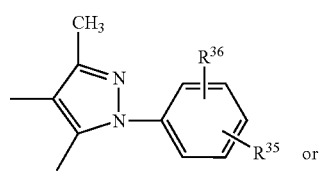

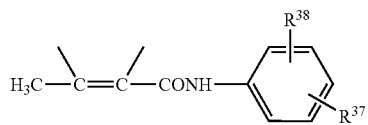

wherein $R^{35}$ and $R^{37}$, which may be the same of different, are Cl, $SO_2R^{32}$, or H,

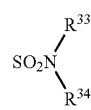

$R^{33}$ and $R^{34}$, which may be the same or different, are independently hydrogen atom, linear or branched C1-C4 alkyl, and $R^{36}$ and $R^{38}$, which may be the same or different, are independently hydrogen atom, linear or branched C1-C18 alkyl, carboxyl, hydroxyl, C1-C18 alkoxy, amino or halogen atoms.

This dye may preferably be selected from any of formula (1)

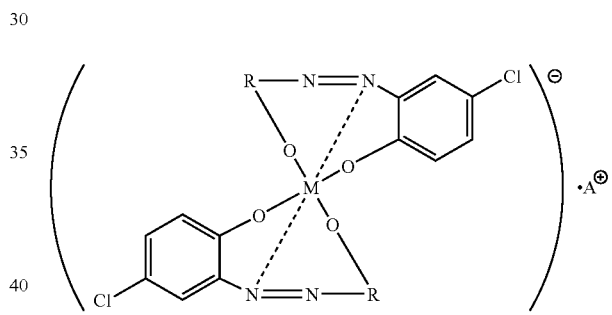

Wherein R is a residual group of a coupling agent, M is divalent or trivalent metal, and A is hydrogen, aliphatic amine with 4 to 18 carbon atoms, or alkylene oxide added amine; or formula (2)

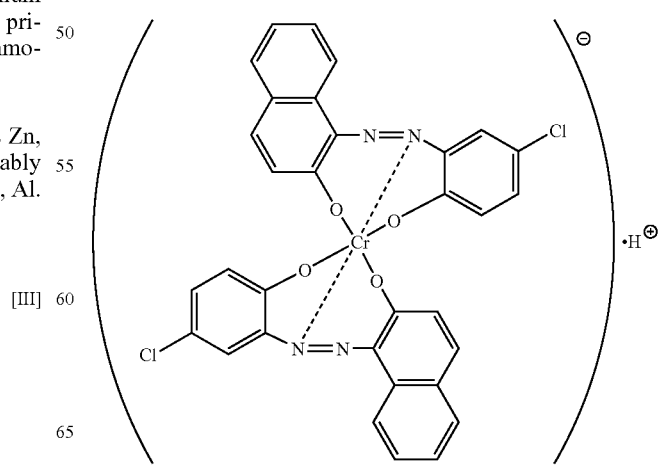

or formula (3)

-continued

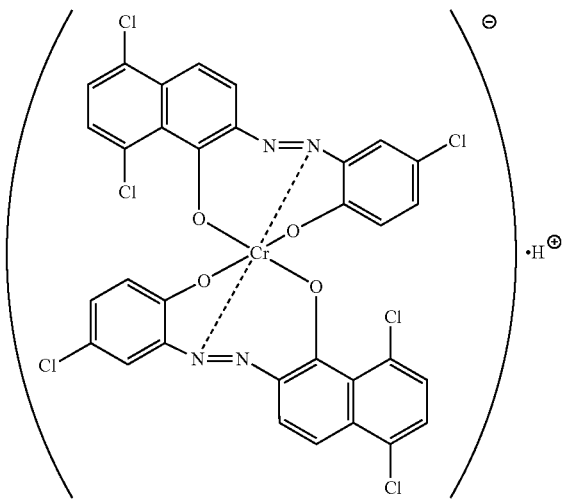

Other aspects of the invention are directed not only to the improvement in laser weldability seen with the resin compositions described and claimed herein, but also the articles formed therefrom. This includes shaped articles formed from discrete sections and subsequently welded together with the laser beam. The invention is further directed to the method for actually welding these articles together.

BRIEF DESCRIPTION OF THE DRAWINGS

The invention will become better understood upon having reference to the drawings herein.

DETAILED DESCRIPTION OF THE INVENTION

Figure 1:
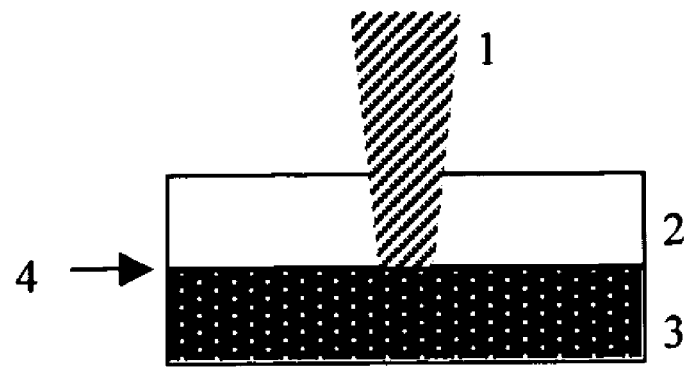
FIG. 1 is a view of articles of differing colors to be laser welded in contact with each other and with a laser beam applied thereto.

The resins utilized as the molded resins for laser welding may be any resin as long as they are thermoplastic resins, but polyamide resins and polyester resins are preferred from the point of view of heat-resistance and transmitting property.

Polyamides useful in this invention include not only conventional nylons, but also copolymers of amides and/or other monomers and blends of different polyamides. The blends may include other thermoplastic polymers and/or blends of the aforementioned copolymers with a polyamide and/or blends of different copolymers with or without thermoplastic polymers. Examples of polyamides suitable for the practice of this invention are polyamide 6 or 6/6, in which the addition of azo-metal complex dyes illustrate the substantial and surprising increase in laser weldability without sacrificing other important properties of the molded article. Polyamide 6 is especially advantageous because its low rate of crystallization results in an increased transmission coefficient for laser beams with particular wavelengths but without any adverse effect on required toughness and warpage. Further it is advantageous in applications such as automobile parts with its balanced range of heat-resistance and mechanical properties.

A wide range of the most common polyester molding compositions useful for blending with colorants in the practice of the present invention are known in the art and includes polyethylene terephthalate homopolymers, polybutylene terephthalate homopolymers, polyethylene terephthalate/polybutylene terephthalate copolymers, polyethylene terephthalate/polybutylene terephthalate mixtures, and mixtures thereof, although other polyesters can be used as well, alone, in combination with each other, or in combination with those polyesters listed above.

Azo-metal complex dyes suitable for use in this invention vary widely and include any azo-metal complex. As used herein the term "azo-metal complex dyes" refers to 1:2 type metallic azo complex dyes. Illustrative of such useful dyes are azo-metal complex dyes as identified above. Other useful azo-metal complex dyes are those described in detail in U.S. Pat. No. 4,527,994 which is incorporated by reference herein.

In the preferred embodiment of the invention, the azo-metal complex dyes for use in the invention are those respectively having the formula (2) as above or the formula (3) as above. Moreover, the azo-metal complex dye is preferably present in amount of from 0.01 to 1% by weight, when the composition comprises polyamide 6 or polyamide 66 as at least the major component of the polyamide resin composition.

Azo-metal dyes of colors other than black and/or other dyes of colors other than black, such as anthraquinone, perinone, or quinophthalone dyes, can be also added to the composition of the present invention for the purposes of appearance adjustment providing such additional dyes are used in such amounts that they do not harm the characteristic properties of the composition of the present invention.

The composition of the present invention may also contain an inorganic filler or reinforcing agent. These include, for example, fibrous reinforcement such as glass fiber, glass flake, carbon fiber, glass beads, talc, kaolin, wollastonite and mica. Glass fiber or glass flake is particularly preferred. Glass fibers suitable for use in the present invention are those generally used as a reinforcing agent for thermoplastic resins and thermosetting resins.

One or more optional compounds tailored for different applications of the resin compositions of this invention can be included in the composition according to the present invention. Typically, additive compounds can include flame retardants, impact modifiers, viscosity modifiers, heat resistance improvers, lubricants, antioxidants and UV-and other stabilizers. The polyamide resin composition of the present invention may have such additive compounds in such amounts that they do not harm its characteristic properties.

FIG. 1 best illustrates the problems associated with conventional compositions used in laser welding. The laser beam 1 is applied and the energy is transmitted through the first article 2 to the second article 3 (containing laser beam absorbing colorants). The surface 4 of the second article 3 having absorbed the laser energy is thereby melted and pressed with the surface of the first article 2. However, for this weld to form, the two thermoplastic articles 2 and 3 must have different transmission and absorption coefficients.

Figure 2:
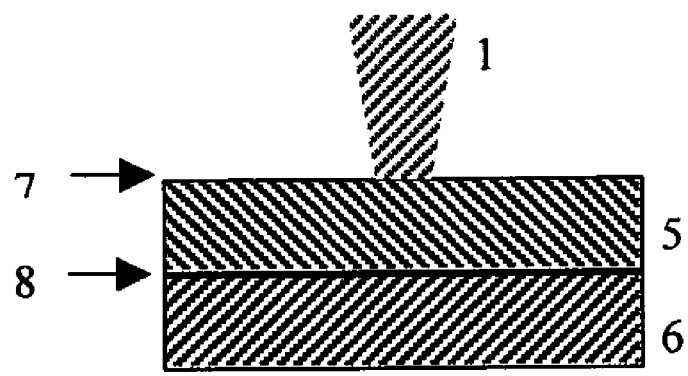
FIG. 2 is a view of articles of identical colors to be laser welded in contact with each other and with a laser beam applied thereto.

In contrast, the inventive technique illustrated in FIG. 2 allows for both articles 5 and 6 to be identical in color. The effective use of the azo complex dyes in both articles 5 (colored but transparent) and 6 (colored but opaque) provides that some energy is absorbed at surface 7 (but not enough to disadvantageously impact the integrity of the surface) and other energy is absorbed at surface 8. The welding of the articles occurs along surface 8, despite both articles being of identical color.

In effect, the creative use of the metallic azo complex dyes herein prepare the transparent colored articles for laser beam treatment and achieve welding together with the opaque colored article. Suitable opaque articles and their compositions are described for example in DE-A-4432081.

EXAMPLES

The present invention is illustrated by the following examples and comparative examples.

Polyamide 6 was mixed with the colorants below in amounts as shown in the able.

Dye-A: 1:2 type metallic azo complex salt dye having the formula [2]
Dye-B: Sumiplast Black H3B
Dye-C: Nigrosine
Dye-D: carbon black
Dye-E: 1:2 type metallic azo complex salt dye having the following formula [4]

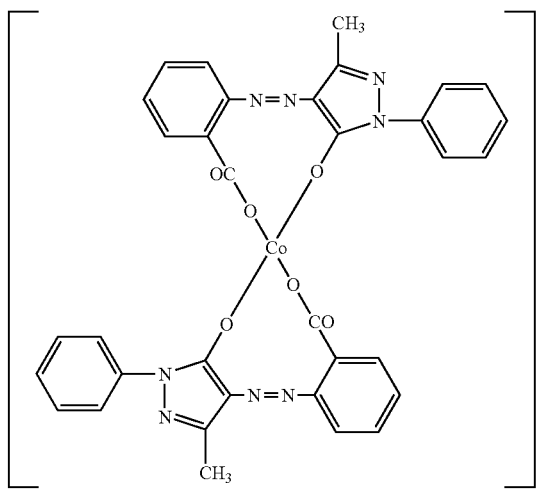

[4]

Such colorants can be blended with the polyamide as neat dyes or a master batch containing the dyes.

All samples contain 30% glass fibers, and the remainder of each composition was polyamide.

The mixtures were melted and kneaded with an extruder to provide pellets. The pelletized mixtures were injection-molded into test bars and plates with an injection molding machine.

The properties were measured as follows:

Transmission Property
Transmittance of the samples with near-infrared laser beam having wavelength of 1064 nm was measured with the molded plates (3.2 mm thick) using a spectrometer (NIRS-6500 produced by Foss NIRS Systems).

Heat Stability
Heat stability of the samples (ASTM type I: 3.2 mm thick) were examined by aging such samples in an air-oven set at 150° C. for 1000 hours and surface appearances of them were visually inspected.

Tensile Strength and Elongation
Tensile strength and elongation were measured according to ISO 527.

Laser Welding Test
The 60 mm×18 mm×1.5 mm test pieces were placed so that 20 mm of each be overlapped. The overlapped area was irradiated with Nd:YAG laser (Olion 510, 1064 nm continuous) set at 4 W with 3 mm diameter for 2 seconds. Welding performance is measured in laser welding the test pieces of the compositions set forth in Table 1 with an opaque workpiece part for a laser beam (lower test piece), being made of the reference composition with black appearance:

| Polyamide 6 | 69.4 wt % |
| Glass fibers | 30 wt % |
| Dye C | 0.5 wt % |
| Dye D | 0.1 wt % |

As to laser weldability, in each of Example 1 through Comparative Example 4, two resin parts that are respectively transparent and opaque for such laser beams and formed of the compositions indicated in the following Table 1 being welded were judged by visual inspection.

TABLE 1

| | | Examples | | | Comparative Examples | | | |
|---|---|---|---|---|---|---|---|---|
| No. | | 1 | 2 | 3 | 1 | 2 | 3 | 4 |
| Polyamide 6 | (wt %) | 69.9 | 69.8 | 69.8 | 70 | 69.9 | 69.5 | 69.8 |
| Fiberglass | (wt %) | 30 | 30 | 30 | 30 | 30 | 30 | 30 |
| Dye A | (wt %) | 0.1 | 0.2 | 0.17 | | | | |
| Dye B | (wt %) | | | | | 0.1 | | |
| Dye C | (wt %) | | | | | | 0.5 | |
| Dye D | (wt %) | | | | | | | 0.2 |
| Dye E | (wt %) | | | 0.03 | | | | |
| Transmittance (1064 nm) | (%) | 45 | 45 | 46 | 47 | 23 | <1 | <1 |
| Appearance | | Black | Black | Black | Creamy white | Black | Black | Black |
| Appearance after air-oven aging | | No change | No change | No change | Changed to dark brown | — | Changed to dark brown | No change |
| Laser weld results | | welded | welded | welded | welded | No adhesion | No adhesion | No adhesion |
| Tensile strength | (MPa) | 174 | | 184 | | | 171 | 190 |
| Elongation | (%) | 3.1 | | 3.7 | | | 3.4 | 3.8 |

Black resins with 1:2 type metallic azo complex salt exhibited equally black appearance as traditional black resins with nigrosine or carbon black as used in the above mentioned Reference composition but showed as high transmittance and welding capability as a natural color resin. Moreover, black resins with 1:2 type metallic azo complex salt retained good appearance after air-oven aging which is required especially for automotive under-the-hood parts. Other black resins as in Comparative Examples 2, 3 and 4 can not afford welding capability.

Example 4

400 grams of (unreinforced) Nylon 6 ZYTEL pellets (available from E.I. DuPont de Nemours and Co.) were dried under vacuum at 120° C., for more than 8 hours, then mixed with a mixture of black metal azo complex dye A (represented by formula [2]) (0.67 g) with yellow metal azo complex dye E represented by the formula [4] (0.13 g) in a stainless tumble mixer with stirring for one hour. The mixture was then injection molded to form the injection molded test specimens (whose sizes are 48 mm×86 mm×3 mm) using K50-C produced by Kawaguchi Steel K. K. and the cylinder temperature was set to 250° C. Mold temperature was 60° C. Good and uniformly black appearance and surface gloss without color shading of the specimens were observed.

Examples 5-11

Unreinforced Nylon 6 ZYTEL pellets (available from E.I. DuPont de Nemours and Co.) were dried under vacuum at 120° C., for more than 8 hours, then mixed with a mixture of black metal azo complex dye A (represented by formula [2]) with yellow metal azo complex dye E represented by the formula [4] in amounts set forth in Table 2 in a stainless tumble mixer with stirring for one hour. The mixture was then injection molded to form the injection molded test specimens (whose sizes are 48 mm×86 mm×3 mm) using K50-C produced by Kawaguchi Steel K. K. and the cylinder temperature was set to 250° C. Mold temperature was 60° C. Good and uniformly black appearance and surface gloss without color shading of the specimens were observed. Transmission properties, appearance and surface gloss were measured by the following test procedures:

(1) Transmission Properties

Transmittance (T) in the range of 400 nm to 1200 nm of the test plates with laser beams having respective wavelengths of 950 nm (Semiconductor laser) and 1050 nm (YAG laser) was measured using a U-3410 spectrometer producted by Hitachi with 60 φ sphere photometer for wavelength from ultraviolet to nexr-infrared. The ratio (TA) of transmission with 950 nm:transmission with 1050 nm and the ratio (TB) of transmission with 1050 nm:transmission of natural resin are determined and compared between the examples.

(2) Appearance and Surface Gloss

Appearance of the test plates were evaluated by measuring Reflection Density (OD) of the test plates by Reflection Density meter TR-927 produced by Macbeth. Test plates having higher OD values are judged to have better surface smoothness and rich in gloss.

(3) Hue Difference ΔE

Hue difference ΔE between the test plate and the reference plate molded with a dye-mixed pellets prepared by 5 kg of Nylon 6 Zytel® pellets (available from E.I. du Pont de nemours and Company) being dried in a dehumifified dryer set at 80° C. for more than 4 hour and mixed with 5 grams of carbon black and 28 grams of nigrosine dye by the following the procedures of Examples 5 through 11 was determined and measured using a colorimeter (produced by Juki, tarde name: JP 7000).

The results are set forth in Table 2.

TABLE 2

|  |  | Example 4 | Example 5 | Example 6 | Example 7 | Example 8 | Example 9 | Example 10 | Example 11 |
|---|---|---|---|---|---|---|---|---|---|
| Polyamide 6 (g) |  | 400 | 500 | 500 | 500 | 500 | 500 | 500 | 500 |
| Dye A (g) |  | 0.67 | 1 | 0.95 | 0.91 | 0.87 | 0.83 | 0.80 | 0.67 |
| Dye E (g) |  | 0.13 | 0 | 0.05 | 0.09 | 0.13 | 0.17 | 0.20 | 0.33 |
| Transmission | TA | 0.43 | 0.43 | 0.43 | 0.43 | 0.43 | 0.43 | 0.43 | 0.49 |
|  | TB | 1.00 | 0.96 | 0.96 | 0.98 | 1.00 | 1.00 | 1.01 | 1.03 |
| OD ΔE |  | 2.57 | 2.55 | 2.57 | 2.57 | 2.57 | 2.57 | 2.56 | 2.56 |
| Hue difference ΔE |  | — | 0.37 | 0.29 | 0.27 | 0.24 | 0.25 | 0.37 | 0.40 |

The resin compositions as in Examples 4 and 6 through 11, with a mixture of black 1:2 type metallic azo complex dye with yellow 1:2 type metallic azo complex dye, exhibit high transmitting property in the near infrared region.

The compositions set forth in Table 2 provide little if any difference in hue during laser welding with opaque articles made of compositions comprising mixtures of carbon black and nigrosine dyes. Hence, the compositions of these Examples enable two articles to be welded without hue difference and achieve laser welding of the two articles with a substantially homogenous visual impression.

What is claimed is:

1. A method of laser welding, comprising the steps of:
preparing a first molded article of a first thermoplastic resin composition comprising a thermoplastic resin and a 1:2 metallic azo complex dye, which composition is transparent to a laser beam, and a second molded article of a second thermoplastic resin composition that is opaque to the laser beam,
positioning said first molded article and said second molded article in contact with each other, and
transmitting a predetermined amount of laser beam energy focused on the area of contact through the first article to the second article.

2. A method of laser welding, comprising the steps of:
preparing a first molded article of a first thermoplastic resin composition comprising a thermoplastic resin and a black colorant, which composition is transparent to a laser beam, and a second molded article of a second thermoplastic resin composition that is opaque to the laser beam,
positioning said first molded article and said second molded article in contact with each other, and
transmitting a predetermined amount of laser beam energy focused on the
area of contact through the first article to the second article,
wherein the black colorant is at least one 1:2 metallic azo complex dye of the following formulas:

The Formula [I]

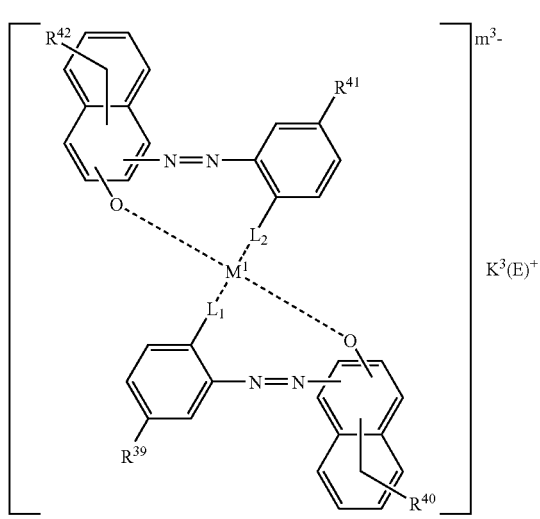

wherein $R^{39}$, $R^{41}$, which may be the same or different, are Cl,

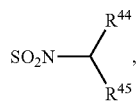

or $SO_2R^{43}$, $R^{44}$, $R^{45}$, which may be the same or different, are independently hydrogen atom, linear or branched C1-C4 alkyl, $R^{43}$ is linear or branched C1-C4 alkyl, $R^{40}$, $R^{42}$, which may be the same or different, are hydrogen, linear or branched C1-C18 alkyl group, linear or branched C2-C18 alkenyl group, sulfonamide group, carboxyl group, mesyl group, hydroxyl group, C1-C18 alkoxy group, acethylamino group, benzoylamino group, a halogen atom or —CONH—$R^{46}$, $R^{46}$ is functional group selected from unsubstituted or substituted linear or branched C1-C18 alkyl or unsubstituted substituted C6-C18 aryl group, $L_1$ and $L_2$ are independently O or COO, (E)$^+$ are H$^+$; cation of alkali metal, ammonium ion, cations of organic amine including aliphatic primary, secondary and ternary amines, quaternary ammonium ion, $K^3$ is an integer, $m^3$ is 0, 1 or 2, $M^1$ is a metal having coordination numbers of from 2 to 4, The Formula [II]

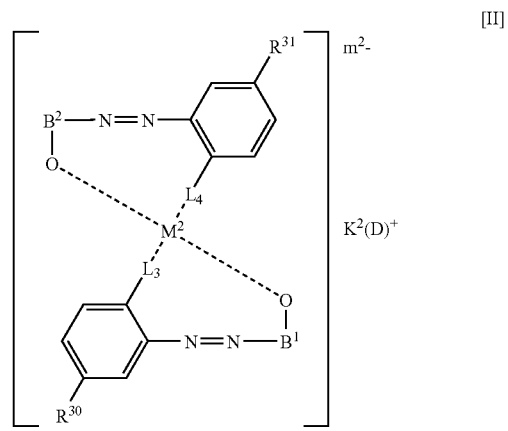

wherein $R^{30}$ and $R^{31}$, which may be the same of different, are Cl,

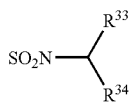

$SO_2R^{32}$, or H, $R^{33}$ and $R^{34}$, which may be the same or different, are independently hydrogen atom, linear or branched C1-C4alkyl, $R^{32}$ is linear or branched C1-C4 alkyl, $L_3$ and $L_4$ are independently O or COO. (D)$^+$ is hydrogen ion, cation of alkali metals, ammonium ion, cations of organic amine including aliphatic primary, secondary and ternary amines, quaternary ammonium ion, $K^2$ is an integer, $m^2$ is 0, 1 or 2, $M^2$ is metals having coordination numbers of from 2 to 4,

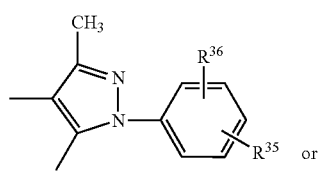

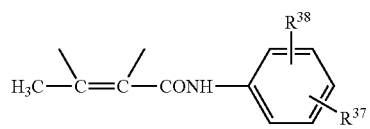

wherein $R^{35}$ and $R^{37}$, which may be the same of different, are Cl,

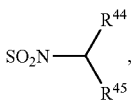

$SO_2R^{32}$, or H, $R^{33}$ and $R^{34}$, which may be the same or different, are independently hydrogen atom, linear or branched C1-C4 alkyl, and $R^{36}$ and $R^{38}$, which may be the same or different, are independently hydrogen atom, linear or branched C1-C18 alkyl, carboxyl, hydroxyl, C1-C18 alkoxy, amino or halogen atoms.

3. The method of claim 1, wherein said 1:2 metallic azo complex dye is selected from the group consisting of:

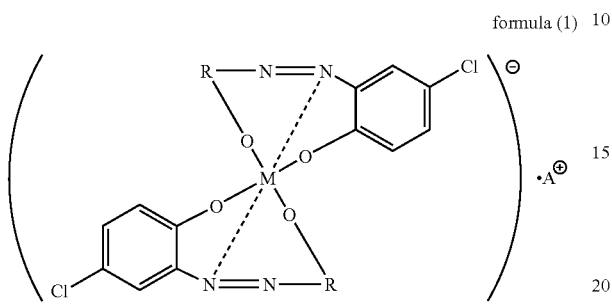

formula (1)

wherein R is a residual group of a coupling agent, M is divalent or trivalent metal, and A is hydrogen, aliphatic amine with 4 to 18 carbon atoms, or alkylene oxide added amine;

or formula (2)

or formula (3)

4. The method of claim 2, wherein said 1:2 metallic azo complex dye is selected from formula (2) or formula (3).

5. The method of claim 2, wherein said 1:2 metallic azo complex dye is present in an amount of from 0.01 to 1% by weight based upon the total weight of the composition.

6. The method of claim 1, wherein the first thermoplastic resin composition and/or the second thermoplastic resin composition further comprises glass fiber or glass flake.

7. The method of claim 1, wherein the first thermoplastic resin composition and/or second thermoplastic resin composition comprises a polyamide resin.

8. The method of claim 1, wherein the first thermoplastic resin composition and/or second thermoplastic resin composition comprises a polyamide copolymer.

9. The method of claim 1, wherein the first thermoplastic resin composition and/or second thermoplastic resin composition comprises a blend of polyamide resins.

10. The method of claim 2, wherein $M^1$ is trivalent Cr, Fe, or Cu.

11. The method of claim 2, wherein $M^2$ is Zn, Sr, Cr, Al, Ti, Fe, Zr, Ni, Co, Mn, B, or Si.

12. The method of claim 2, wherein $M^2$ is trivalent Cr, Co, Cu, Ni, or Al.

13. A shaped article formed by the method of claim 1.

* * * * *